United States Patent [19]

Hirao et al.

[11] 4,191,564
[45] Mar. 4, 1980

[54] BRASS HAVING SUPERIOR ADHESION AND WEAR RESISTANT PROPERTIES

[75] Inventors: Yutaka Hirao, Toyama; Kunio Hata, Kurobe; Masao Hosoda, Toyama, all of Japan

[73] Assignee: Chuetsu Metal Works Co., Ltd., Tokyo, Japan

[21] Appl. No.: 924,183

[22] Filed: Jul. 13, 1978

[30] Foreign Application Priority Data

Nov. 24, 1977 [JP] Japan .................. 52-140904

[51] Int. Cl.$^2$ .............................................. C22C 9/04
[52] U.S. Cl. ................................. 75/157.5; 75/159; 75/160; 75/162
[58] Field of Search ............ 75/157.5, 159, 160, 75/162; 148/11.5 C, 12.7 C, 32.5, 160

[56] References Cited

U.S. PATENT DOCUMENTS

| 666,670 | 1/1901 | Hennig | 75/157.5 |
|---|---|---|---|
| 1,457,289 | 5/1923 | Ostendorf | 75/157.5 |
| 2,007,008 | 7/1935 | Staples | 75/157.5 |
| 2,101,930 | 12/1937 | Davis et al. | 75/159 |
| 3,132,939 | 5/1964 | Badia | 75/159 |
| 3,252,793 | 5/1966 | Hesse | 75/157.5 |
| 3,402,043 | 9/1968 | Smith | 75/157.5 |

FOREIGN PATENT DOCUMENTS

| 906786 | 8/1972 | Canada | 75/157.5 |
|---|---|---|---|
| 572472 | 10/1945 | United Kingdom | 75/157.5 |

*Primary Examiner*—L. Dewayne Rutledge
*Assistant Examiner*—Peter K. Skiff
*Attorney, Agent, or Firm*—Norbert P. Holler

[57] ABSTRACT

A brass suitable for use as the material of such mechanical parts which are required to have good adhesion and wear resistant properties such as for gears of various machines, rolls and dies for use in pipe forming and deep drawing titanium plate material, and so forth. The brass consists essentially, each by weight of, 45% to 75% of copper, 2.0% to 7.0% of aluminum, 0.1% to 2.0% of iron, 1.0% to 5.0% of nickel, 0.5% to 2.0% of silicon, 0.1% to 2.0% of cobalt and the remainder being zinc and incidental impurities.

5 Claims, No Drawings

BRASS HAVING SUPERIOR ADHESION AND WEAR RESISTANT PROPERTIES

BACKGROUND OF THE INVENTION

1. Field of the Invention

The present invention relates to a brass suitable for use as the materials of those mechanical parts or members which have to have good adhesion and wear resistant properties, such as the gears of various machines, rolls and dies for pipe forming and deep drawing stainless steel or titanium plate materials, and so forth.

2. Description of Prior Arts

Conventionally, aluminum bronze type alloys having precipitated gamma ($\gamma$) phase and ordinary type bronze have been generally used as the materials of dies for pipe forming and deep drawing stainless steel and titanium plate materials. These alloys are, however, generally expensive and, in addition, suffer various disadvantages. For instance, when an alloy of this type is used as the material of rolls for titanium pipe forming, it is often experienced that the titanium material adheres to the peripheral surface of the roll during the pipe forming operation, resulting inconveniently in dents or scratches on the surface of the titanium pipe under forming and, in the worst case, thus turning out defective.

SUMMARY OF THE INVENTION

It is therefore a major object of the invention to overcome the aforesaid problems of the prior art by providing a less expensive novel brass material having good adhesion and wear resistant properties.

To this end, according to the invention, there is provided a brass containing, each by weight, 45% to 75% of copper, 2.0% to 7.0% of aluminum, 0.1% to 2.0% of iron, 1.0% to 5.0% of nickel, 0.5% to 2.0% of silicon, 0.1%–2.0% of cobalt and the remainder zinc.

The above and other objects, as well as advantageous features of the invention will become clear from the following description of the preferred embodiments.

DESCRIPTION OF THE PREFERRED EMBODIMENTS

In sharp contrast to the conventional aluminum bronze alloys in which the kappa ($\kappa$) phase of Fe-Al and gamma ($\gamma$) phase are precipitated in a beta ($\beta$) phase matrix, the alloy in accordance with the invention is an Ni-Si type intermetallic compound precipitated in the $\alpha+\beta$ phase, $\beta$ phase or $\beta+\gamma$ phase matrix. It has been proved that this intermetallic compound is precipitated, regardless of the casting method, always in globular or spheroidal shape and, at the same time, finely and uniformly distributed over the entire area of the matrix. The crystal grains of this alloy are further refined by an addition of cobalt, so as to further stabilize the mechanical strength. Besides, the addition of cobalt causes a precipitation of the intermetallic compound in a petal-like shape, so as to greatly improve the wear resistant property, as well as the seizure or adhesion resistant property of the alloy in relation with other kinds of metals.

An alloy 2 and an alloy 3 of the invention are obtained by reducing the amounts of additives within the ranges as defined in the claim. In these alloys, the metallographical structures are changed to $\beta$ phase and $\alpha+\beta$ phase, respectively, so as to enhance the ductility of the alloy, although the hardness is slightly reduced. Thus, these alloys are suitable for use as the materials of such mechanical parts which have to withstand high repetitive stress and have high adhesion and wear resistant properties, e.g. as hydraulic parts and automobile parts.

For obtaining a sufficient mechanical strength and good wear resistant properties, the nickel content of the alloy of the invention is preferably selected to fall within the range of between 1.0% and 5.0%, while the silicon content is preferably 0.5% to 2.0%, from the view point of the ratio of formation of Ni-Sn type intermetallic compound and castability of the alloy.

The aluminum, which is an element encouraging $\gamma$ phase precipitation and is also essential for achieving a high hardness of the alloy of the invention. However, an aluminum content exceeding 7% will adversely affect ductility, while an aluminum content below 2% will be too small to provide a sufficient hardening effect.

The cobalt is used for the purpose of precipitation strengthening and grain refinement. A cobalt content exceeding 2.0% is uneconomical also the effects of the precipitation strengthening and grain refinment do not fully correspond to the increase of the cobalt content beyond 2.0%. No remarkable effect is obtained with a cobalt content below 0.1%.

At least 0.1% or iron content is necessary for grain refinement of the cast structure, but more than 2% of iron content is not recommended because the precipitates are rendered unacceptably coarse.

The copper content is limited to fall within the range of 45% to 75%, for obtaining the matrix structure of the alloy of $\alpha+\beta$, $\beta$ or $\beta+\gamma$ phase.

In the foregoing description, the contents of the additive elements are all given as percent by weight. The following Table 1 shows the compositions of examples of the brass in accordance with the invention, along with those of conventionally used tin bronze and aluminum bronze, by way of comparison. Also, the results of adhesion tests and wear tests conducted on these alloys are shown in tables 2 and 3, respectively.

Table 1

| | Chemical Compositions | | | | | | | | |
|---|---|---|---|---|---|---|---|---|---|
| | Cu | Zn | Fe | Al | Ni | Si | Co | Sn | Pb |
| tin bronze | remainder | 4.79 | — | — | 0.18 | — | — | 4.42 | 5.54 |
| aluminum bronze | | | | | | | | | |
| #1 | " | — | 3.37 | 10.41 | — | — | — | — | — |
| #2 | " | — | 4.34 | 12.72 | — | — | — | — | — |
| #3 | " | — | 4.50 | 13.70 | — | — | — | — | — |
| alloy of this invention | | | | | | | | | |
| #1 | " | 33.0 | 0.83 | 5.13 | 3.01 | 1.19 | 0.57 | — | — |
| #2 | " | 30.5 | 0.72 | 4.01 | 3.02 | 1.11 | 0.61 | — | — |
| #3 | " | 27.0 | 0.76 | 3.87 | 2.98 | 0.82 | 0.69 | — | — |

Table 2

| Adhesion Resistant Property | | | |
|---|---|---|---|
| surface pressure (kg/cm²) | 52.4 | 74.6 | 83.4 |
| PV (Kg/cm² m/sec) | 57.7 | 82.1 | 91.7 |
| tin bronze | no adhesion | adhesion | — |
| aluminum bronze | | | |
| #1 | " | " | — |
| #2 | adhesion in 30 seconds | — | — |
| #3 | adhesion in 7 min. 20 sec. | — | — |
| alloy of invention | | | |
| #1 | no adhesion | no adhesion | adhesion (after) 15 min. 30 sec. |
| #2 | " | " | adhesion (after) 12 min. 25 sec. |
| #3 | " | " | adhesion (after) 12 min. 18 sec. |

Note: The test pieces of respective alloys were sand-cast under the same casting conditions. The critical conditions for adhesion with titanium as a mating test body without applying any lubricant were observed and recorded for respective test pieces.

Table 3

| Wear Resistant Properties | | |
|---|---|---|
| | | wear down (mm) |
| aluminum bronze | #2 | n = 12  $\bar{x}$ = 0.42 |
| alloy of invention | #1 | n = 10  $\bar{x}$ = 0.05 |
| | #2 | n = 10  $\bar{x}$ = 0.06 |
| | #3 | n = 10  $\bar{x}$ = 0.06 |

Note: Ring-shaped test pieces made of respective alloys having tapered inner peripheral surfaces were kept for 10 minutes in sliding contact with tapered cones having mating tapered peripheral surface and made of Cr-Mo steel Japanese Industrial Standard (JIS) SCM22, under application of a pressing load of 33 Kg, at a revolution speed of the tapered cone of 920 RPM, within a bath of a gear oil. The amount of wear is shown as the displacement of the test piece in the axial direction of the taper cone due to the wear.

It will be seen from tables 2 and 3 that the brass in accordance with the present invention exhibit much superior adhesion and wear resistance properties to those of conventionally used alloys such as tin bronze and aluminum bronze.

The illustrated examples are, of course, not exclusive, and the contents of the alloying elements can be changed in various manners within the ranges as specified in the appended claims.

What is claimed is:

1. A brass having superior adhesion and wear resistant properties consisting essentially of, each by weight, 45% to 75% of copper, 2.0% to 7.0% of aluminum, 0.1% to 2.0% or iron, 1.0% to 5.0% of nickel, 0.5% to 2.0% of silicon, 0.1% to 2.0% of cobalt and the remainder zinc.

2. A brass according to claim 1 wherein the constituents, each by weight, are: 0.83% of iron, 5.13% of aluminum, 3.01% of nickel, 1.19% of silicon, 0.57% of cobalt, 33% of zinc and the balance copper.

3. A brass according to claim 1 wherein the constituents, each by weight, are: 0.72% of iron, 4.1% of aluminum, 3.02% of nickel, 1.11% of silicon, 0.61% of cobalt, 30.5% of zinc and the balance copper.

4. A brass according to claim 1 wherein the constituents, each by weight, are: 0.76% of iron, 3.87% of aluminum, 2.98% of nickel, 0.82% of silicon, 0.69% of cobalt, 27% of zinc and the balance copper.

5. A brass according to claim 1 comprising less than 2% silicon.